United States Patent Office 3,655,808
Patented Apr. 11, 1972

3,655,808
PREPARATION OF OILS FROM ISOBUTENE
Gary L. Driscoll, Boothwyn, Pa., assignor to Sun Oil Company, Philadelphia, Pa.
No Drawing. Filed July 6, 1970, Ser. No. 52,772
Int. Cl. C07c 3/10
U.S. Cl. 260—683.15 D    12 Claims

ABSTRACT OF THE DISCLOSURE

Polymerization of isobutene to form a polyisobutene oil having a viscosity index of from 90–130, in the presence of a lower alkylhalide such as 2-chloro-2-methylpropane using a catalyst selected from the class consisting of ethyl aluminum sesquichloride, ethyl aluminum dichloride and diisobutyl aluminum chloride and a solvent selected from the class consisting of nitromethane and nitrobenzene at from −30 to 100° C. and preferably from 0° C. to 50° C. Optionally a metal halide such as cobalt chloride may be used as a promoter for the catalyst.

CROSS REFERENCES TO RELATED APPLICATIONS

This application is related to U.S. application Ser. No. 52,773 entitled "Oligomerization of Isobutene and α-Methylstyrene," filed on even date herewith by Gary L. Driscoll and David L. Kerr; U.S. application Ser. No. 53,268 entitled "Phosphorous Compound Promoted Oligomerization of Isobutene," filed on even date herewith by Gary L. Driscoll; U.S. application Ser. No. 52,771 also filed on even date herewith by Gary L. Driscoll and now abandoned entitled "Polymerization of Dialkyl Vinylidene Compounds to Oils"; and U.S. application Ser. No. 52,300 entitled "Branched Hydrocarbons in the $C_{16}$–$C_{40}$ Range Having Maximally Crowded Germinal Methyl Groups," filed on even date herewith by Gary L. Driscoll, Irl N. Duling, David S. Gates and Robert W. Warren; the disclosures of which are hereby incorporated by reference.

BACKGROUND OF THE INVENTION

In the past traction transmissions utilizing rolling traction surfaces have found only limited use due to the lack of a fluid to lubricate such surfaces while still maintaining an adequate coefficient of traction. Recently, several fluids have been discovered which have an adequate coefficient of traction but which have a lower viscosity index than is desired. In the past polymers of isobutene and other oils have been produced using catalyst systems based on aluminum chloride and boron trifluoride. These systems are severe in nature and produce oils having a nearly continuous spectrum of numbers of carbon atoms and isomeric structures. In general, and apparently due to this wide spectrum of isomeric structures in the various individual oil molecules, these processes produce oils having a relatively low viscosity index. In general these processes are unable to produce a polyisobutene oil in the $C_{24-40}$ range having a viscosity index above 85. For many applications, including the use of these oils as a traction fluid or traction fluid component, a high viscosity index is desirable due to the variety of temperatures which may be encountered.

SUMMARY OF THE INVENTION

It has now been found that polyisobutene oils having a high viscosity index (hereinafter referred to as ASTM–V.I.) which generally is in the range of from 90 to 130 and preferably 95 to 130 as determined by ASTM D 2270 as well as a Viscosity Temperature Function viscosity index in those ranges as determined by the technique of W. A. Wright as set forth in ASTM Bulletin No. 215, 84, (1956) (hereinafter referred to as VTF–VI), can be prepared by proper selection of solvent and catalyst. The solvent serves as a polar solvent to solvate the intermediate carbonium ions formed during the reaction, and to complex the catalyst to give a catalytically active species which remains in the solvent phase. Suitable solvents for meeting this requirement have been found to be nitromethane and nitrobenzene.

The catalysts used in the present invention have the formula $R_{2+n}Al_2Cl_{4-n}$ where $n$ is a number from 0 to 2 and R is a lower alkyl group. Preferred catalysts include ethyl aluminum sesquichloride, ethyl aluminum dichloride, and diisobutylaluminum chloride. If desired the activity of the catalyst may be modified by the addition of a metal halide such as cobalt chloride, calcium chloride, copper chloride or nickel bromide. A lower alkyl halide and preferably a tertiary halide such as 2-chloro-2-methylpropane should also be present. In general this lower alkyl halide is present in a mole ratio of from 0.1:1 to 10:1 modifier to alkyl aluminum halide with from 0.5:1 to 2:1 being the preferred range.

In general the temperature can be varied from −30° C. to +100° C. with from 0° C. to 50° C. being the preferred range and 25° C. to 35° C. being an especially preferred range. The volume of polyisobutene oil prepared is generally at least equal to the volume of solvent for a given run but the ratio of the volume of oil prepared to volume of solvent present may easily exceed 10:1. When carrying out the present invention in a continuous operation such as by continuously feeding isobutene, catalyst, and solvent while continuously removing the reaction medium and separating the product from the catalyst and solvent; the ratio of solvent to polyisobutene oil generally is maintained at from 2:1 to 1:2.

The catalyst may be used in an amount equal to from 0.1 to 40 volume percent of the solvent present, and preferably from 1 to 20 volume percent of the solvent present.

The concentration of free isobutene in the reaction medium is relatively small and can be controlled by the pressure maintained at a given temperature thus controlling the molecular weight of the product. Generally pressures of from about 10 to 100 p.s.i. absolute have been found most suitable.

Conversions of isobutene to the various telomers of 100% are obtained under appropriate combination of conditions. Yields of 300 to 500 ml. of oil per gram of catalyst are readily attainable. The feed stock can vary from 5 to 100% isobutene, the remainder being any inert hydrocarbons. The presence of other butenes, each in amounts equal to the isobutene concentration is not detrimental, since isobutene is selectively polymerized by the catalyst system. The efficiency of isobutene removal from such isobutene-butenes mixtures depends on the particular conditions being used, but can be 80% or more. The process is relatively insensitive to small amounts of impurities such as air, water, organo-sulfur or organo-nitrogen compounds.

The polyisobutene oils of the present invention may have a molecular weight of from 224 to 2,000. The preferred product is the tetramers to decamer range. The tetramer in the present case consists predominantly of a major and a minor component. The hydrogenated major tetramer component has the structure:

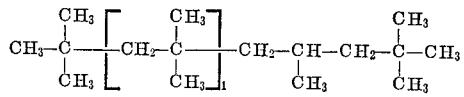

and the hydrogenated minor component has the structure:

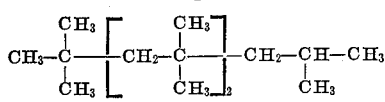

This latter type of structure predominates above the tetramer i.e. at pentamer and above. The repeating units for the pentamer and above is indicated by the brackets.

These oils are used in the as produced unsaturated forms as electrical oils. The oils can also be used in the unsaturated form as traction fluids, or they may be hydrogenated to the saturated form for this purpose. When the oils are to be hydrogenated this can readily be accomplished with conventional hydrogenation catalysts such as Raney nickel, platinum, palladium or rhodium. The present reaction system is normally capable of producing at least 50 wt. percent of these tetramers to decamers as based on isobutene reacted. For most uses, such as a traction fluid, the higher molecular weight product may be left with the tetramers to decamers, but the dimers and trimers should be separated therefrom along with the monomer. This is accomplished by distillation.

The oils as produced by the present invention find particular advantage in their use as traction fluids due to their high coefficients of traction and excellent viscosity temperature properties. The requirements of a traction fluid are discussed in U.S. Pat. Nos. 2,549,377; 3,440,894; and 3,411,369. Exemplary tractive devices in which the traction fluids of the present invention find use are disclosed in U.S. Pat. Nos. 1,867,553; 2,871,714; 3,006,206; and 3,184,990.

Additionally, these oils find use in caulks and as reactants, electrical oils, etc.

DESCRIPTIONS OF THE PREFERRED EMBODIMENTS

Example 1

Into a 2,000 ml. Parr reactor are placed 500 ml. of nitrobenzene and 5 ml. of 2-chloro-2-methyl propane. The reactor is pressured twice to 15 p.s.i.g. with isobutylene and vented each time. Then 10 ml. of a catalyst solution consisting of a 25% solution of ethylaluminum sesquichloride in hexane is added to the reactor and the isobutene feed started. The inlet pressure is 10 p.s.i.g. The temperature of the contents of the reactor are maintained at from 35 to 40° C. After 60 minutes 5 ml. more of the catalyst solution is added. After 85 minutes from start up the reaction is shut down. The total product including solvent is 1250 ml. The contents of the flask are transferred to a separatory funnel. The product is washed twice with saturated aqueous sodium chloride solution. The oil is then distilled under a vacuum to remove low boilers and nitrobenzene solvent leaving 420 ml. of an oil fraction having the following properties:[1]

$KV_{210° F.}=6.21$ cs., $KV_{100° F.}=42.7$ cs., ASTM–VI= 101, VTF–VI=92.

Example 2

Distilled nitromethane (75 ml.) and anhydrous cobalt chloride (0.2 g.) are placed in a 250 ml. glass pressure bottle. The bottle is then pressurized with isobutene four times to 20 p.s.i.g. with release of pressure after each operation to insure the complete removal of oxygen from the system. Then 0.85 ml. of 2-chloro-2-methylpropane and 1.77 ml. of a 25% solution of ethyl aluminum sesquichloride is added to the system. The external temperature of the bottle is maintained between 20 and 30° C. The inlet isobutene gas pressure is 10 p.s.i.g. After 60 minutes the reaction is shut down and the contents of the bottle transferred to a separatory funnel. After allowing five minutes for phase separation, the nitromethane layer is drained from the bottom of the funnel. The oil layer (130 ml.) is washed twice with water and vacuum distilled. The following cuts are obtained (1) 55 ml. of a trimer cut B.P. to 80° C. at 1 mm. Hg, 55 ml. of an oil cut B.P. 80–200° C. at 1 mm. Hg, and 10 ml. of a pot residue. The properties of the oil cut are $KV_{210}=3.01$ cs., $KV_{100}=11.50$ cs., ASTM–VI=133, VTF–VI=125.

Example 3

Example 2 is repeated except that the cobalt chloride is omitted and the reaction is stopped after about 24 g. of product is formed. After work up 12.2 g. of oil, B.P. 80–200° C. at 1 mm. Hg, is obtained and about 3.5 g. of bottoms. The properties of the oil are $KV_{210}=3.42$ cs., $KV_{100}=15.26$ cs., VTF–VI 107, ASTM–VI=109.

Example 4

Nitrobenzene (75 ml.) and 2-chloro-2-methylpropane are placed in a 250 ml. glass pressure bottle. The bottle is pressurized with isobutene four times to 20 p.s.i.g. with release of pressure after each operation to insure removal of oxygen from the system. Di-isobutylaluminum chloride (2 ml. of a 25% solution in hexane) is added and the isobutylene feed started. The reaction medium is maintained between 20 and 40° C. The isobutene inlet pressure is 10 p.s.i.g. After an hour the isobutene flow is stopped and the contents of the flask transferred to a separatory funnel. The product is washed with water, dried over anhydrous calcium chloride, and vacuum distilled. Fifty-five percent of the product is an oil boiling at 80–200° C. at 1 mm. Hg. The oil has the following properties: $KV_{210}=6.20$ cs., $KV_{100}=43.1$ cs., ASTM–VI=99, VTF–VI=90.

In the claims:

1. A process for preparing isobutene oils comprising contacting isobutene in the presence of a lower alkyl halide with a catalytic amount of a compound of the formula $R_{2+n}Al_2Cl_{4-n}$ where $n$ is a number from 0 to 2 and R is a lower alkyl group, in a solvent selected from the class consisting of nitromethane and nitrobenzene at from −30 to 100° C. and recovering polyisobutene oil.

2. The process of claim 1 wherein the lower alkyl halide is a tertiary chloride.

3. The process of claim 2 wherein the catalyst is present in an amount of from 0.1 to 40 volume percent of the solvent present.

4. The process of claim 3 wherein the temperature is from 0° C. to 50° C.

5. The process of claim 4 wherein the pressure is maintained at from 10 to 100 pounds per square inch absolute.

6. The process of claim 5 wherein the lower alkyl halide is 2-chloro-2-methylpropane.

7. The process of claim 6 wherein the catalyst is ethyl aluminum sesquichloride.

8. The process of claim 6 wherein the catalyst is di-isobutylaluminum chloride.

9. The process of claim 7 wherein the solvent is nitromethane.

10. The process of claim 7 wherein the solvent is nitrobenzene.

11. The process of claim 8 wherein the solvent is nitrobenzene.

12. The process of claim 9 wherein cobalt chloride is present in a molar ratio of cobalt chloride to ethyl aluminum sesquichloride of from 0.1:1 to 10:1.

References Cited

UNITED STATES PATENTS

| | | | |
|---|---|---|---|
| 2,085,535 | 6/1937 | Langedijk et al. | 260—683.15 |
| 2,388,428 | 11/1945 | Mavity | 260—683.15 X |
| 2,678,957 | 5/1954 | Fontana et al. | 260—683.15 |

PAUL M. COUGHLAN, Jr., Primary Examiner

U.S. Cl. X.R.

252—429 A

---

[1] As used herein KV stands for kinetic viscosity as determined by ASTM D445.